US011496453B2

(12) United States Patent
Retterath et al.

(10) Patent No.: US 11,496,453 B2
(45) Date of Patent: Nov. 8, 2022

(54) BINARY EXPERIMENTATION ON RUNNING WEB SERVERS

(71) Applicant: Microsoft Technology Licensing, LLC., Redmond, WA (US)

(72) Inventors: David Scott Retterath, Sammamish, WA (US); Zackaria Adel Ali, Seattle, WA (US); Arye Gittelman, Mercer Island, WA (US); Steven Li, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 768 days.

(21) Appl. No.: 16/265,622

(22) Filed: Feb. 1, 2019

(65) Prior Publication Data

US 2019/0166111 A1    May 30, 2019

Related U.S. Application Data

(63) Continuation of application No. 15/263,298, filed on Sep. 12, 2016, now Pat. No. 10,230,712.

(51) Int. Cl.
*H04L 9/40* (2022.01)
*G06F 11/36* (2006.01)
(Continued)

(52) U.S. Cl.
CPC .......... *H04L 63/08* (2013.01); *G06F 11/3644* (2013.01); *G06F 11/3688* (2013.01);
(Continued)

(58) Field of Classification Search
CPC ....... H04L 63/08; H04L 67/34; H04L 63/102; H04L 63/123; H04L 2463/082;
(Continued)

(56) References Cited

U.S. PATENT DOCUMENTS 6,976,163 B1   12/2005  Hind et al.
7,140,013 B2   11/2006  Te'eni et al.
(Continued)

OTHER PUBLICATIONS

Barr, Miles, and Susan Eisenbach. "Safe upgrading without restarting." International Conference on Software Maintenance, 2003. ICSM 2003. Proceedings.. IEEE, 2003. (Year: 2003).*
(Continued)

*Primary Examiner* — Jung W Kim
*Assistant Examiner* — Sameera Wickramasuriya
(74) *Attorney, Agent, or Firm* — Leonard J. Hope; Newport IP, LLC

(57) ABSTRACT

Systems and methods to enable on-the-fly modification of running processes on a webserver more quickly and efficiently are discussed herein. A code vault is used to store binaries for use in production code running on a server, which are downloaded and implemented in the running process when authorized by developers. The process retrieves the binaries from the code vault to deploy the modifications to a specified audience without having to re-instantiate or run a parallel process with the new binaries. Binaries for different audiences or subsequent experiments may be downloaded onto the same machine, but remain isolated. Control of the deployments may require multi-factor or multi-user authentication and are logged for change control.

18 Claims, 7 Drawing Sheets

(51) Int. Cl.
*H04L 67/00* (2022.01)
*G06F 21/57* (2013.01)
*G06F 21/40* (2013.01)

(52) U.S. Cl.
CPC .............. *G06F 21/40* (2013.01); *G06F 21/57* (2013.01); *H04L 63/102* (2013.01); *H04L 63/123* (2013.01); *H04L 67/34* (2013.01); *G06F 2221/033* (2013.01); *H04L 2463/082* (2013.01)

(58) Field of Classification Search
CPC ...... G06F 11/3644; G06F 21/40; G06F 21/57; G06F 11/3688; G06F 2221/033
See application file for complete search history.

(56) References Cited

U.S. PATENT DOCUMENTS

| | | | |
|---|---|---|---|
| 7,784,044 B2 | 8/2010 | Buban et al. | |
| 7,810,087 B2 | 10/2010 | O'Brien | |
| 8,141,047 B2* | 3/2012 | Akeel | G06F 11/3696 717/125 |
| 8,146,073 B2 | 3/2012 | Sinha | |
| 8,543,998 B2 | 9/2013 | Barringer | |
| 8,607,203 B1* | 12/2013 | Mehra | G06F 11/3668 717/127 |
| 8,701,104 B2* | 4/2014 | Soderstedt | G06F 8/66 717/173 |
| 8,806,469 B2* | 8/2014 | Jones | G06F 8/656 717/168 |
| 8,813,039 B2* | 8/2014 | Maczuba | G06F 11/3692 717/128 |
| 9,015,837 B1* | 4/2015 | De Los Reyes | G06F 8/65 726/23 |
| 9,098,375 B2* | 8/2015 | Narkinsky | G06F 8/658 |
| 9,391,861 B1 | 7/2016 | Odean et al. | |
| 9,442,715 B2* | 9/2016 | Zhang | H04L 67/10 |
| 10,230,712 B2 | 3/2019 | Retterath et al. | |
| 10,650,145 B2* | 5/2020 | Hayrynen | G06N 20/00 |
| 2002/0144248 A1* | 10/2002 | Forbes | G06F 8/62 717/167 |
| 2007/0028217 A1* | 2/2007 | Mishra | G06F 11/3688 717/124 |
| 2007/0074187 A1 | 3/2007 | O'Brien | |
| 2008/0120595 A1 | 5/2008 | O'Farrell et al. | |
| 2009/0106742 A1* | 4/2009 | Shah | G06F 11/3688 717/131 |
| 2010/0115506 A1 | 5/2010 | Ljungbjörn | |
| 2011/0078790 A1* | 3/2011 | Fazunenko | G06F 11/3664 726/22 |
| 2011/0202905 A1* | 8/2011 | Mahajan | H04L 67/34 717/140 |
| 2012/0174068 A1* | 7/2012 | Gutfleisch | G06F 11/3688 717/124 |
| 2012/0216184 A1* | 8/2012 | Jones | G06F 8/656 717/172 |
| 2013/0047140 A1* | 2/2013 | Shann | G06F 11/3612 717/128 |
| 2013/0061128 A1 | 3/2013 | Lucco et al. | |
| 2013/0174126 A1* | 7/2013 | Belihomji | G06F 11/3668 717/127 |
| 2013/0232480 A1 | 9/2013 | Winterfeldt et al. | |
| 2014/0208308 A1 | 7/2014 | Harrop et al. | |
| 2014/0282425 A1* | 9/2014 | Zhao | G06F 11/3466 717/127 |
| 2014/0325664 A1 | 10/2014 | Nekhoroshev | |
| 2014/0331206 A1* | 11/2014 | Abraham | G06F 11/3676 717/124 |
| 2014/0351807 A1 | 11/2014 | Wen et al. | |
| 2015/0286556 A1* | 10/2015 | Ellis | G06F 11/3692 717/125 |
| 2015/0339158 A1 | 11/2015 | Harris et al. | |
| 2015/0347119 A1* | 12/2015 | Wang | G06F 8/65 717/120 |
| 2016/0019043 A1* | 1/2016 | Ramasamy | G06F 8/65 717/170 |
| 2016/0092196 A1* | 3/2016 | Kuchibhotla | G06F 8/65 717/170 |
| 2016/0092197 A1 | 3/2016 | Kuchibhotla | |
| 2016/0132422 A1* | 5/2016 | Allen | G06F 8/65 717/170 |
| 2016/0328316 A1* | 11/2016 | Balsavias | G06F 11/3692 |
| 2017/0109269 A1* | 4/2017 | Angermayer | G06F 8/443 717/106 |
| 2017/0235661 A1* | 8/2017 | Liu | G06F 8/443 717/106 |
| 2017/0277890 A1* | 9/2017 | Hayrynen | G06F 11/3688 |
| 2018/0232298 A1* | 8/2018 | Lopian | G06F 11/3688 |
| 2018/0253296 A1* | 9/2018 | Brebner | G06F 8/20 |

OTHER PUBLICATIONS

H. Cleve and A. Zeller, "Locating causes of program failures," Proceedings. 27th International Conference on Software Engineering, 2005. ICSE2005., 2005, pp. 342-351, doi: 10.1109/ICSE.2005. 1553577. (Year: 2005).*

"Checking Running and Dormant Virtual Machines for the Necessity of Security Updates in Cloud Environments" Roland Schwarzkopf; Matthias Schmidt; Christian Strack; Bernd Freisleben 2011 IEEE Third International Conference an Cloud Computing Technology and Science Year: 2011.

Fiedel, Noah, "Running your models in production with TensorFlow Serving", Published on: Feb. 16, 2016 Available at: https://research.googleblog.com/2016/02/running-your-models-in-production--with.html.

* cited by examiner

BINARY EXPERIMENTATION ON RUNNING
WEB SERVERS

CROSS-REFERENCE TO RELATED APPLICATIONS

This application is a continuation of U.S. patent application Ser. No. 15/263,298, filed Sep. 12, 2016, entitled, "BINARY EXPERIMENTATION ON RUNNING WEB SERVERS." The disclosure of this priority application is hereby incorporated by reference in its entirety into the present application.

BACKGROUND

Web servers provide computing resources for users to run their software on as part of the "cloud." These servers may be offered as part of a service from the cloud provider to the users, which may be classified as: Infrastructure as a Service (IaaS), where the user provides the operating system and software; Platform as a Service (PaaS), where the user provides the software and the cloud host provides the operation system; or Software as a Service (SaaS), where the cloud host provides both operating system and software to the user. Due to the nature of the cloud, updating any of the software provided to a given server may require software or services to be taken offline temporarily or to be substituted by a second process, and for the modified code to be heavily tested before deployment, as any change to the software to benefit one user may interfere with operations for another user. This leads to a slow and methodical update policy for web servers, which prevents the cloud host and the users from applying patches and updates to software quickly and efficiently.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods are discussed herein to allow for the fast and isolated distribution of various binaries to affect processes on web servers while those processes are running. The binaries (patches, updates, additional programs or other data) provided to various servers are isolated to affect only a specific subset of users and software running on the associated web servers. The binaries are checked into a source code control system, from which the running processes may download and access the binaries when so signaled. In various aspects, a given binary may be selected for execution by a set audience (one or more users regardless of host machine, one or more specific web servers regardless of user), and the selection may require multi-factor authentication for added security and change logging. Selected web servers retrieve selected binaries from the source code control system and the resolution of those binaries against existing binaries running in the process are controlled so that the selected binaries override the dependencies in the running process, but only for the selected audience. Any dependencies from the binaries that are not resolved within a given binary fall back to the running process; isolating the experimental binaries of one user from the core systems and experimental binaries used by other users, while allowing the process to continue running.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
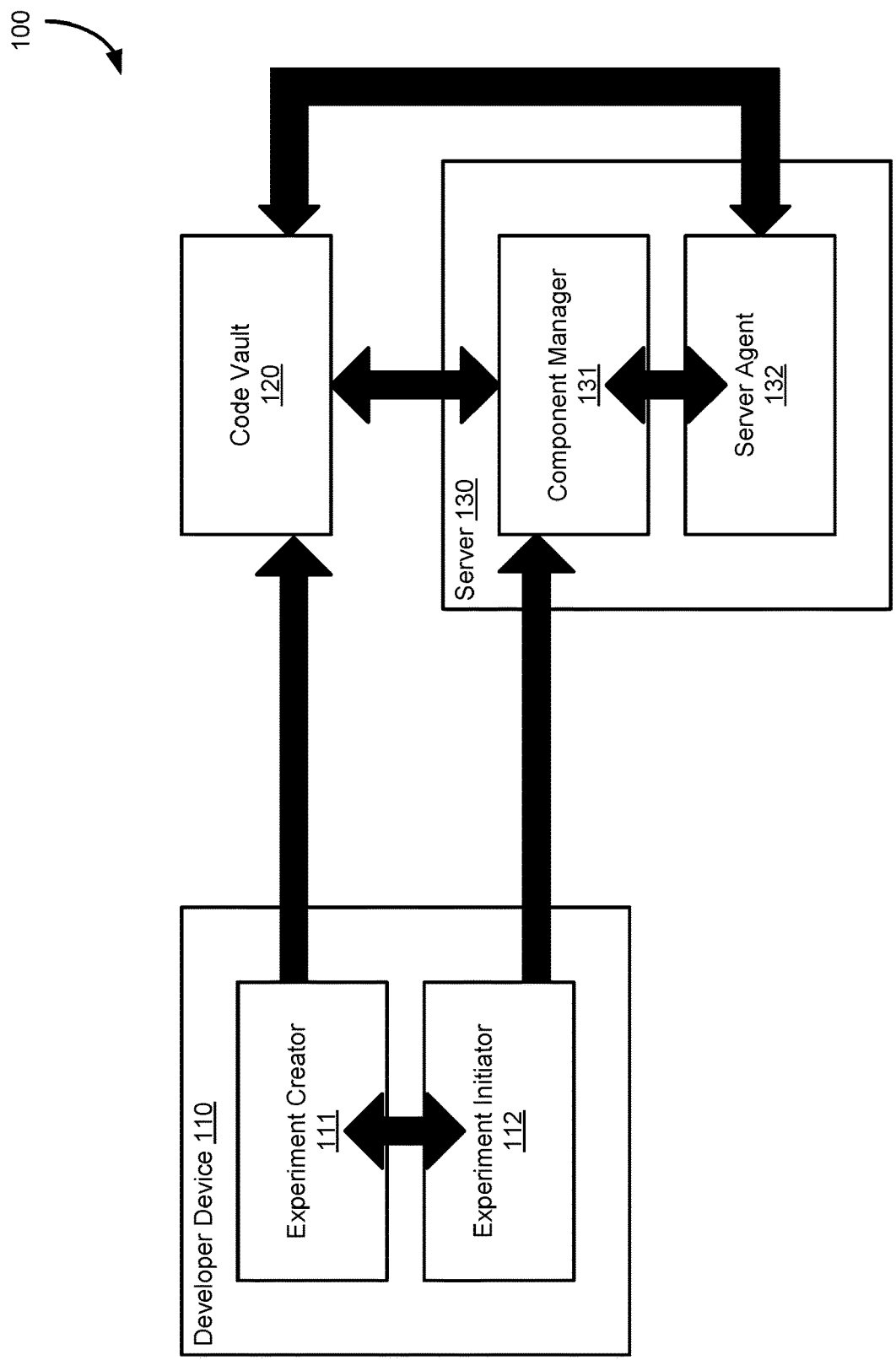
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems and methods are discussed herein to allow for the fast and isolated distribution of various binaries to affect processes on web servers while those processes are running. The binaries, may provide patches, updates, additional programs or other data for use with the running processes. In one example, the binaries are provided by a file providing class and function definitions, such as a Dynamic Link Library (DLL). A DLL is a library that contains code and data that can be used by more than one program at the same time. For example, in an operating system, a DLL enables common dialog box related functions for various portions of the operating system or programs run by the operating system to be shared, which promotes code reuse and efficient memory usage. By using a DLL, a program can be modularized into separate components. For example, an accounting program may be sold by module. Each module can be loaded into the main program at run time if that module is installed. Because the modules are separate, the load time of the program is faster, and a module is only loaded when that functionality is requested. Additionally, updates are easier to apply to each module without affecting other parts of the program.

FIG. 1 illustrates an example environment 100 in which the present disclosure may be practiced. As illustrated, a developer device 110 is in communication with a code vault 120 and one or more servers 130 offered as part of a cloud computing service to users. In various aspects, the code vault 120 may be hosted on the developer device 110, the server 130, or a remote computing device. Similarly, the developer device 110 may be provided as a virtual machine running on the server 130 or as a distinct device.

The developer device 110, the code vault 120, and server 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, mini-computers, printers, and mainframe computers. The hardware of these computing systems is discussed in greater detail in regard to FIGS. 4, 5A, 5B, and 6. Developer devices 110 are operated by developers, who may be humans or automated systems (e.g., "bots") that create new binaries for use on the servers 130 in conjunction with the applications and processes provided to users of those servers 130. In various aspects, the developer device 110, the code vault 120, and the server 130 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The developer device 110 provides, as services to a developer, an experiment creator 111 by which the binaries to implement on the servers 130 are created, and an experiment initiator 112, by which the developer signals the servers 130 to pull a given experimental binary from the code vault 120 to implement with the currently running processes on the servers 130 for a given audience. The binaries created by the experiment creator 111 are checked into the code vault 120 for access by one or more servers 130 at a later time, and the one or more servers 130 are signaled to access one or more experimental binaries from the code vault 120 via the experiment initiator 112. In various aspects, which particular servers 130 or which particular users' servers 130 are to pull a given experimental binary (i.e., are the audience for a particular binary) from the code vault 120 may be specified by the developer via the experiment creator 111 or via the experiment initiator 112. In various aspects, the experiment creator 111 and the experiment initiator 112 may be different aspects of one application, while in other aspects the experiment creator 111 and experiment initiator 112 are provided as distinct applications.

The code vault 120 stores the experimental binaries for one or more developers, which may be part of one or more development teams. For example, the code vault 120 may store the experimental binaries for all of the developers from one development team, but may also store the experimental binaries for developers from another development team. These experimental binaries may be held so that they are hidden from other developers or development teams, so that, for example, developers from a first team cannot see or access binaries stored for a second team. Alternatively, developers may share binaries that they have submitted to the code vault 120 across teams. In various aspects, an experimental binary may have an associated certificate or hash value stored with the experimental binaries so that parties can verify (e.g., for security purposes) the authenticity of the binary or the developer who submitted the binary.

The servers 130 retrieve experimental binaries from the code vault 120 via a component manager 131 in response to a signal sent from the experiment initiator 112. In various aspects, the component manager 131 may require multi-factor authentication before pulling the experimental binaries from the code vault 120 or signaling the server agent 132 to use the experimental binaries. Such multifactor authentication may verify the identity and the permissions of the user of the developer device 110 that requested an experiment to be run, and may require more than one developer to signal approval before initiating the experiment. Similarly, the component manager may verify the identities of the requested binaries (or the identifies of the developers who posted the requested binaries) to ensure that malicious code is not inserted into the servers 130. The component manager 131 logs the identities of the binaries, the requesting users, and the audience for the experiment for record keeping and change logging purposes. In various aspects, each server 130 within the server farm of cloud computing environment may run its own component manager 131, or multiple servers 130 may share one component manager 131.

The server agent 132 runs the applications and operating systems that are made available to the users. Each server 130 provides one or more server agents 132 to its users, which may access the server 130 and the running applications and processes on Virtual Machines (VM) running on the server 130. The behaviors of the processes running on the servers 130 are set by the server agents 132 and determine which experiments, if any, affect the behaviors of the running processes. The server agent 132 identifies whether the server 130 on which it runs or the processes that it is managing is part of the audience for an experiment. In response, the server agent 132 will prioritize calls from the running processes to use the experimental binaries of an active experiment rather than the production code for the binaries or the binaries from another experiment. The server agent 132 resolves any conflicts between the running processes and the experimental binaries (or between multiple experimental binaries) so that the processes and/or the server 130 on which they are run do not need to be shut down to implement the experimental binaries.

Figure 2:
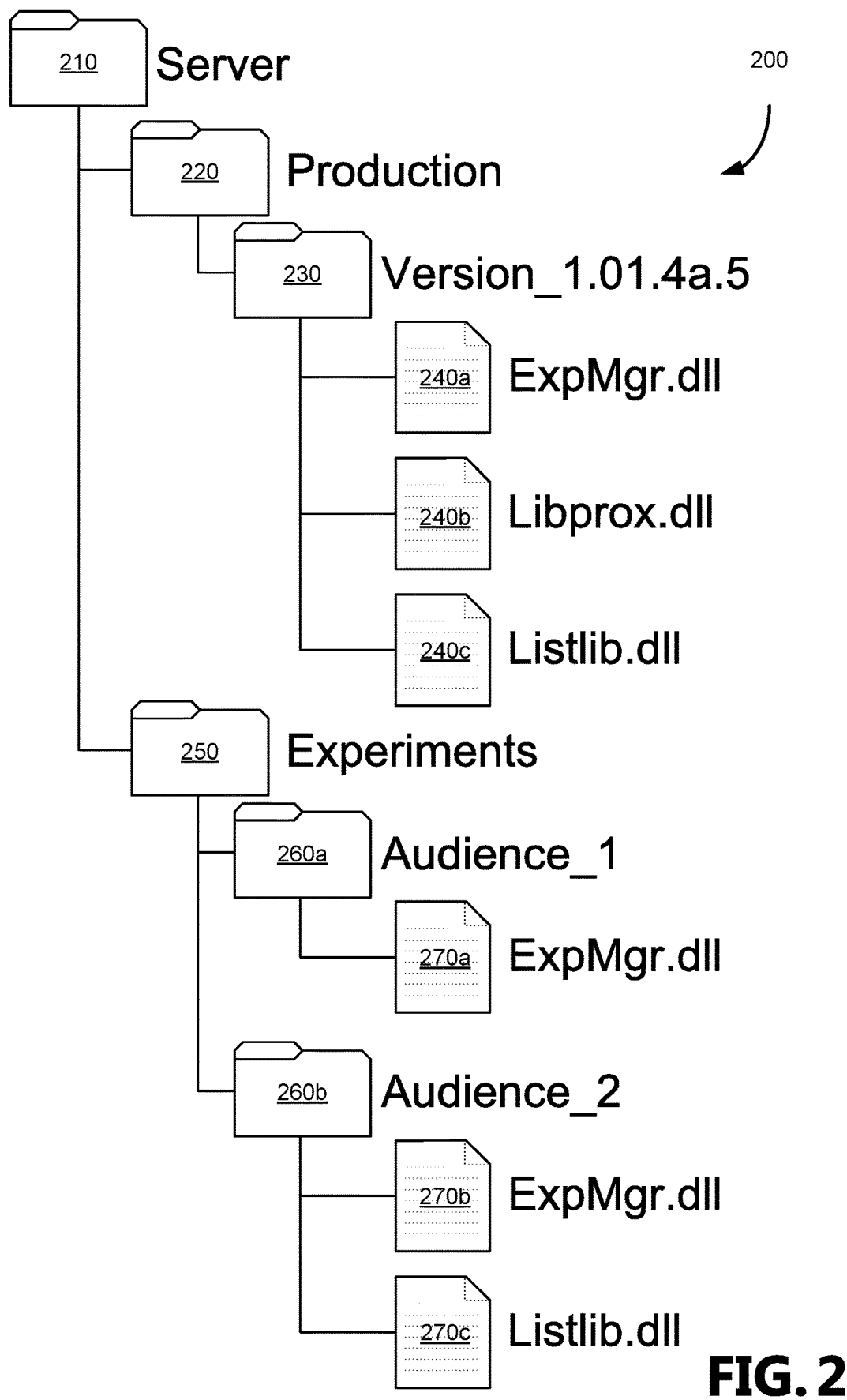
FIG. 2 illustrates an example file path that may be run on a server.

FIG. 2 illustrates an example file path 200 that may be run on a server 130 to discuss in regard to conflict resolution between binaries. As will be appreciated, in different file systems, the individual files and documents may be arranged and made addressable by an operating system differently on the physical computer readable storage device and the example file path 200 is provided for illustrative purposes only; other file paths with more or fewer files and folders with different names are possible in different aspects.

As illustrated, a series of files and documents depend from a parent library 210 for the server (labeled "Server" in this example). The production file 220, containing the files and documents for the production releases of the running process, and the experiment file 250, containing the files and documents for various experimental binaries that have been accessed by the component manager 131, both depend from the parent library 210.

The production file 220 (labeled "Production" in this example) contains one or more version files 230, each containing different versions of the running process and its component binaries 240 that have been distributed for general consumption within the cloud computing environment. In various aspects, the server agent 132 uses the highest numbered version file 230 when more than one version file 230 is present in the production file 220, while in other aspects, only one version file 230 is maintained in the production file 220 at a time. Although three component binaries 240 (first component binary 240a, second component binary 240b, and third component binary 240c) are illustrated, one of ordinary skill in the art will recognize that the number of component binaries within a given version file may be greater or lesser than what is illustrated in FIG. 2.

The experiment file 250 (labeled "Experiments" in this example) contains one or more audience files 260 (illustrated as a first audience file 260a and a second audience file 260b, for illustrative purposes), which contain one or more experimental binaries 270 for use with the running process.

The experimental binaries 270 and the associated audience file 260 are pulled from the code vault 120 when authorization has been received, and may be placed in the file paths 200 of one or more servers 130. As will be appreciated, in a cloud computing environment, a server 130 may host multiple users, and a given user may be hosted on multiple servers 130, therefor the authorized experimental binaries 270 may be deployed to multiple servers 130, some of which may not be part of the intended audience. The server agent 132 determines whether the given server 130 on which the server agent 132 runs is part of the intended audience and will use a given set of experimental binaries 270 instead of the component binaries 240 of the production-level code of the running process to be modified.

For example, when the server agent 132 determines that the server 130 is part of the audience for the first audience file 260a, it will use the experiment binaries 270 instead of the component binaries 240; overriding the component binaries 240 for the running process. For example, the first audience file 260a includes a first experimental binary 270a titled "ExpMgr.dll", which will override the corresponding first component binary 240a titled "ExpMgr.dll" based on the shared title. Similarly, in another example, when the server agent 132 determines that the server 130 is part of the audience for the second audience file 260b, the second experimental binary 270b titled "ExpMgr.dll" will override the corresponding first component binary 240a and the third experimental binary 270c will override the corresponding third component binary 240c based on their shared titles.

In an another example, when the server agent 132 determines that the server 130 is part of the audience for both the first audience file 260a and the second audience files 260b, the server agent 132 will determine which of the audience files 260 is more recent, and use the corresponding experimental binaries 270. In various aspects, the more recent audience file 260 is determined by which audience file 260 the component manager 131 was signaled to implement most recently or which audience file 260 is associated with an experimental binary 270 most recently pulled from the code vault 120. When a newer experiment is to be run on the server (e.g., the first audience file 260a was running, and the second audience file 260b is queued to run), the server agent 132 will back out the changes made by the older experiment (letting the component binaries 240 override the older experimental binaries 270) and then implement the newer experimental binaries 270.

When an experimental binary 270 includes a dependency (e.g., for a function or class defined in another binary), the server agent 132 will attempt to resolve the dependency by first pulling experimental binaries from within the audience file 260 and then pulling the component binaries 240 to identify hierarchical relationships for functions and classes used in the experimental binary 270. For example, if the first experimental binary 270a includes a dependency from a "LibProx.dll", the server agent 132 will use the second component binary 240b (titled, "LibProx.dll" in the present example) to satisfy the experiment binary's dependency. The server agent 132 enforces isolation between the audience files 260, such that no dependencies can be formed between two binaries in different audience files 260. Any dependencies from the experimental binaries 270 that are not resolved within an associated audience file 260 fall back to the source code held in the production file 220; isolating the experimental binaries 270 of one audience from the core systems and experimental binaries 270 used by other audiences, while allowing the process to continue running as it is modified.

Figure 3:
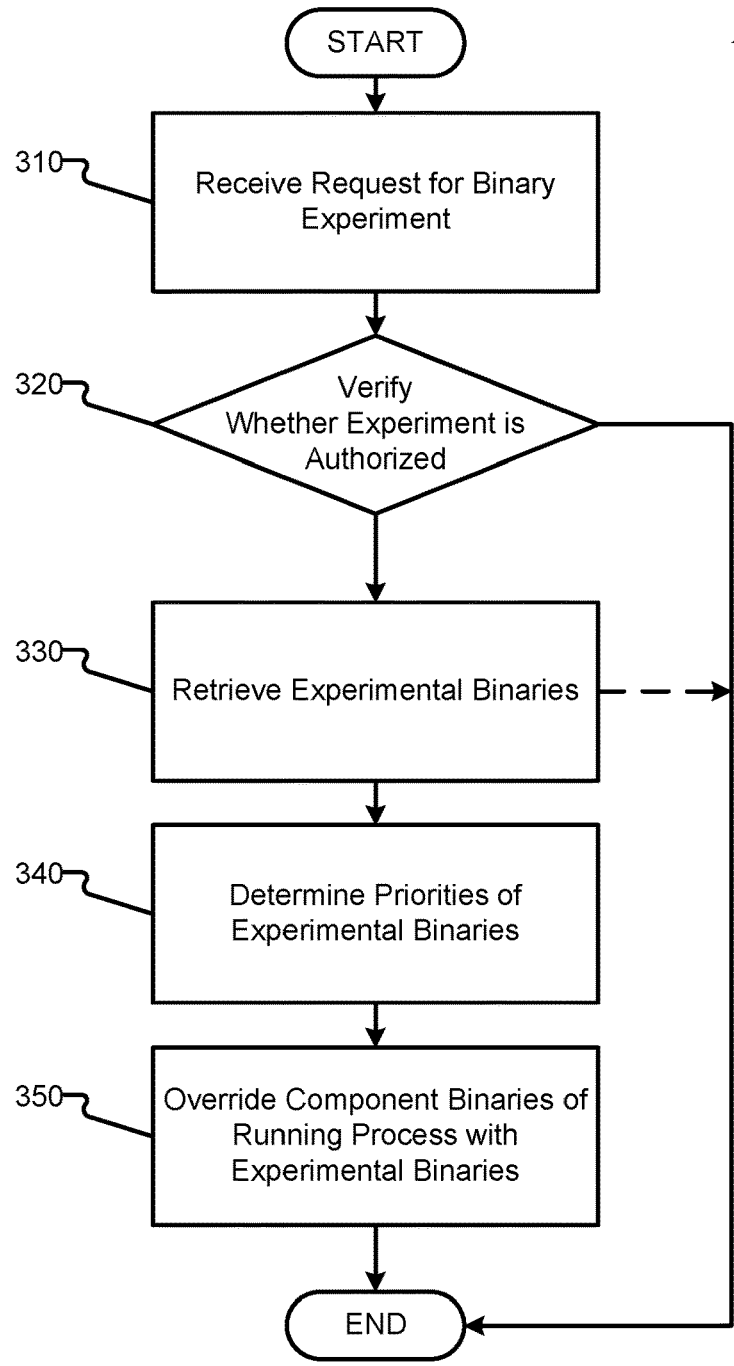
FIG. 3 is a flow chart showing general stages involved in an example method for providing user-targeted modification of a running process on a cloud-based server.

FIG. 3 is a flow chart showing general stages involved in an example method 300 for providing user-targeted modification of a running process on a cloud-based server. Method 300 begins at OPERATION 310 when a request to begin an experiment is received from a developer device 110. In various aspects, the request identifies one or more experimental binaries 270 to use in the experiment, a duration or time window in which to run the experiment, and an audience for the experiment. In various aspects, the audience may be one or more users of a cloud service, specific servers 130 in the cloud service, or a combination of server types and users.

Method 300 proceeds to DECISION 320, where it is determined whether the experiment is authorized. To determine whether the experiment is authorized, the component manager 131 determines whether the requesting user has sufficient permissions to request the experiment for the given audience (e.g., by checking login credentials for the requesting user with a domain controller running in the cloud environment) and whether the experimental binaries 270 stored in the code vault 120 are trustworthy (e.g., checking a certificate of the code vault 120). In various aspects, the component manager 131 may also require multi-factor authentication, either from the requesting user (e.g., to use a second developer device 110 to verify the request) or from a second, verifying user (using the same or a different developer device 110) to ensure multi-user permission to run the experiment as requested.

In response to determining that the experiment is not authorized, method 300 may conclude or wait until an additional authentication factor is received. In various aspects, the method 300 may wait for a predetermined amount of time (e.g., n seconds/minutes/hours) before invalidating the request received at OPERATION 310 and concluding.

In response to determining that the experiment is authorized, method 300 proceeds to OPERATION 330, where the experimental binaries 270 are received from the code vault 120. The experimental binaries 270 are pulled from the code vault 120 onto one or more servers 130 and are organized according to the audience (e.g., into audience files 260) so that multiple experiments may be present on a given server 130, but isolated from one another to impact the running processes only as designated for the specified audience.

In an optional aspect, the component manager 131 may hash the received experimental binaries 270 and compare the verification hash against a hash value for the experimental binaries 270 received from the code vault 120 to determine whether the experimental binaries 270 are what they claim be or have been modified. If the verification hashes do not match the hash values, indicating that the binaries have been modified from what was submitted by the developer, method 300 may conclude as the received binaries are not trusted. In various aspects, the component manager 131 may signal the developer device 110 that the method 300 concluded due to a hash-mismatch.

At OPERATION 340 the priorities of the binaries for use in the running process are determined. As will be appreciated, the experimental binaries 270 in the authorized experiment will be given priority over the component binaries 240 to which they correspond, but experimental binaries 270 from prior authorized experiments will be backed out of priority so that no more than one experiment can be run for a given user on a given server 130 at one time. To determine which binaries are given priority, a hash table is consulted by the server agent 132 and compared against the hashes of various experimental binaries 270 provided in the request for the experiment to determine which experimental binaries 270 are to be given priority for use with the running process. In various aspects, the hash table is constructed when the server 130 initializes and is updated as additional binaries are downloaded, and provides hashes of the experimental binaries 270 as a dictionary for the experiments to identify experimental binaries 270 from.

Proceeding to OPERATION 350, the experimental binaries 270 that have priority override the component binaries 240 of the production code for the running processes. When the experimental binaries 270 override the component binaries 240, any call to a binary from the running process will attempt to use the experimental binaries 270 from the active experiment before falling back to the component binaries 240 from the production file 220, allowing the processes that use these binaries to continue running and experience the effects of the experimental binaries 270 then next time the binary is referenced. Experimental binaries 270 from other experiments are not used to resolve any dependencies and when a prior experiment is supplanted by a new experiment, the experimental binaries 270 of the prior experiment are no longer called to. Method 300 may then conclude.

In various aspects, method 300 may be synchronous or asynchronous regarding the reception of the experimental binaries 270 and their use by the running process. For example, in an asynchronous implementation, an initial request for the experimental binaries 270 is initiated when the running process attempts to call one or more of the experimental binaries 270, which will result in the experiment binaries 270 being downloaded from the code vault 120 while the running process continues to make calls the corresponding component binaries 240 until the download of the experimental binaries 270 is complete and their priorities and dependencies are resolved, at which time the running process will resolve calls to binaries to the experimental binaries 270. In an example synchronous implementation, the experimental binaries 270 are downloaded as the calls are made to those binaries by the running process, which uses those experimental binaries 270 as they are downloaded. As will be appreciated, experimental binaries 270 that are part of a prior experiment may remain on a server 130 for later user or may be preloaded in anticipation of their use in a future experiment.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
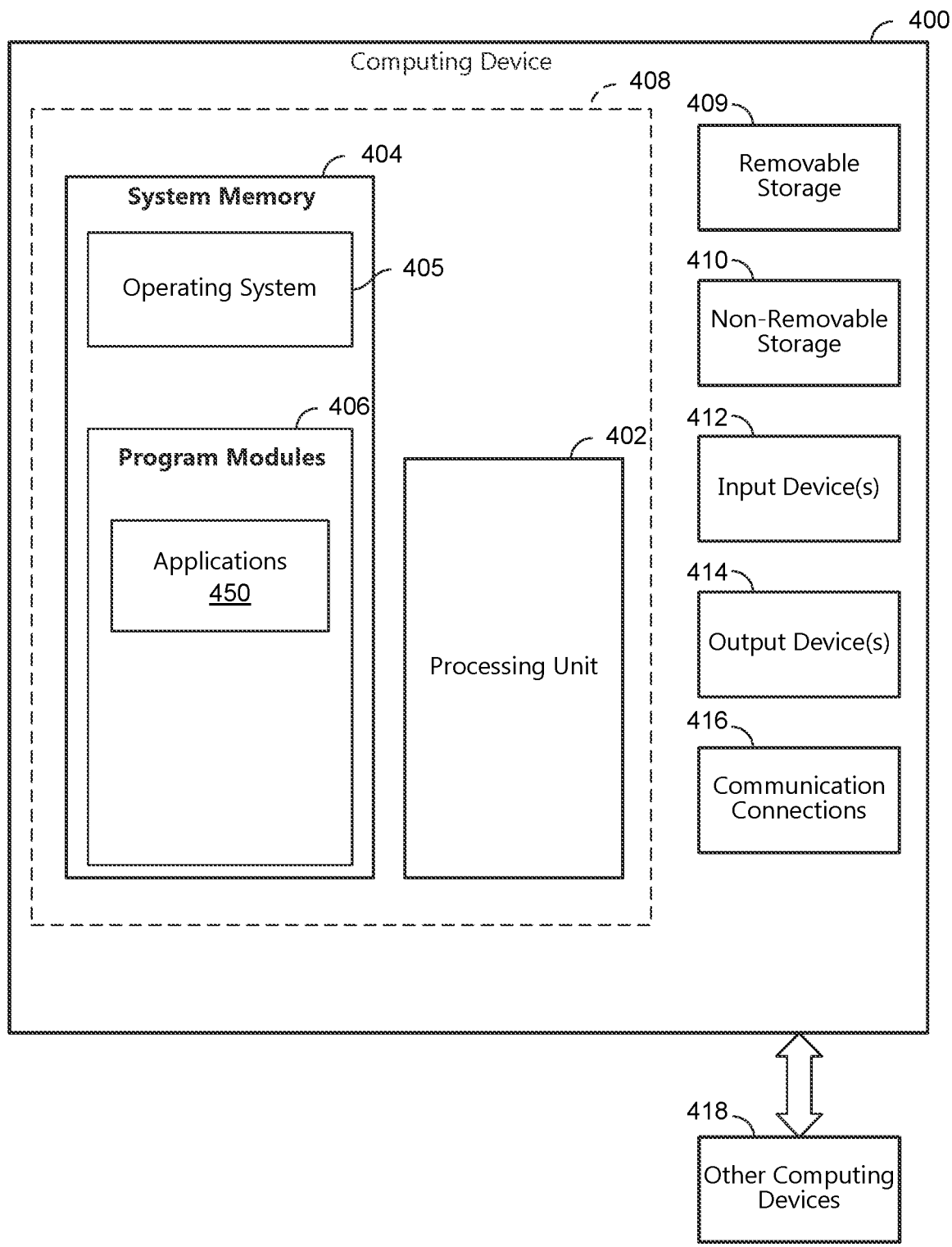
FIG. 4 is a block diagram illustrating example physical components of a computing device.
Figure 5A:
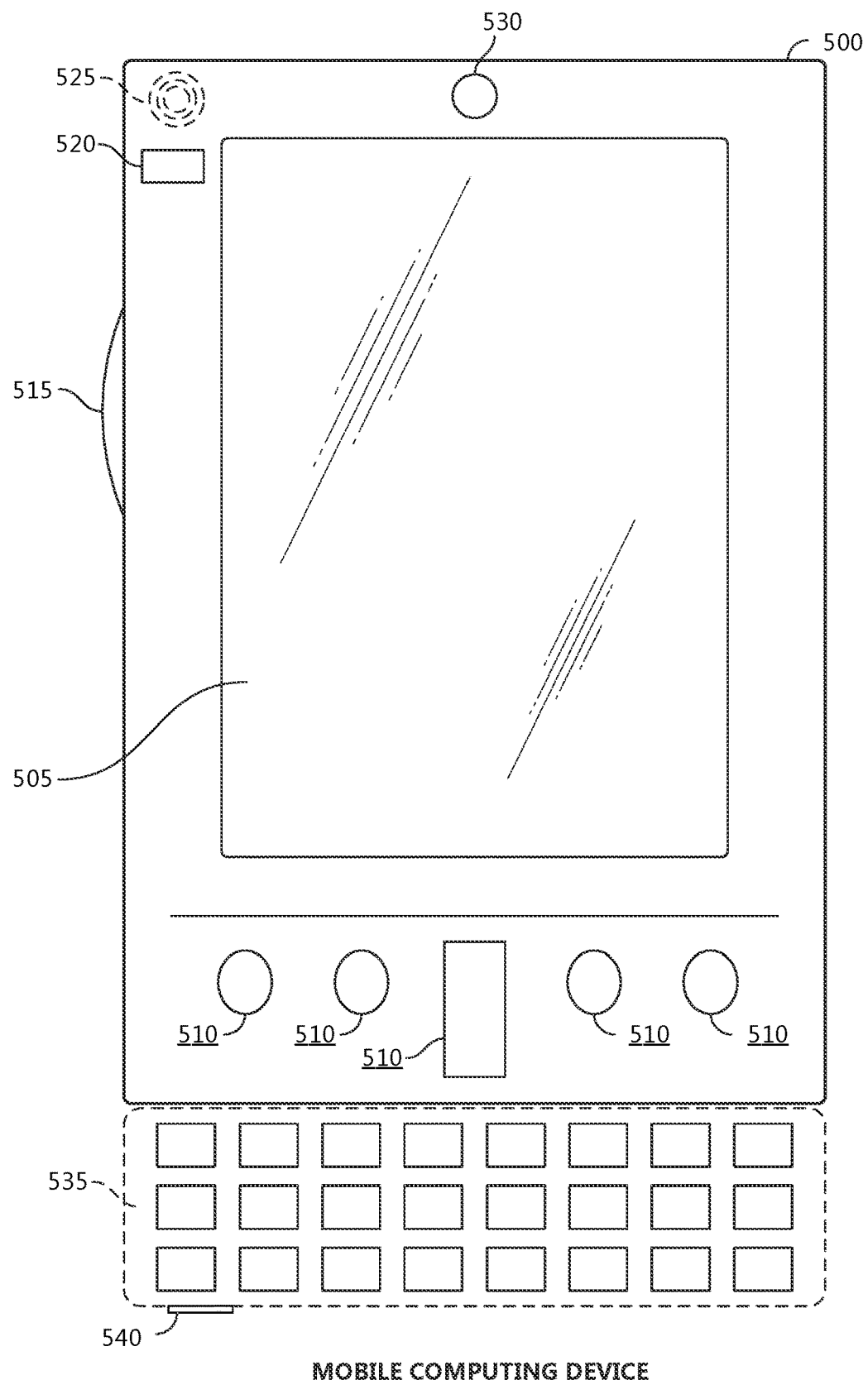
FIGS. 5A and 5B are block diagrams of a mobile computing device.
Figure 5B:
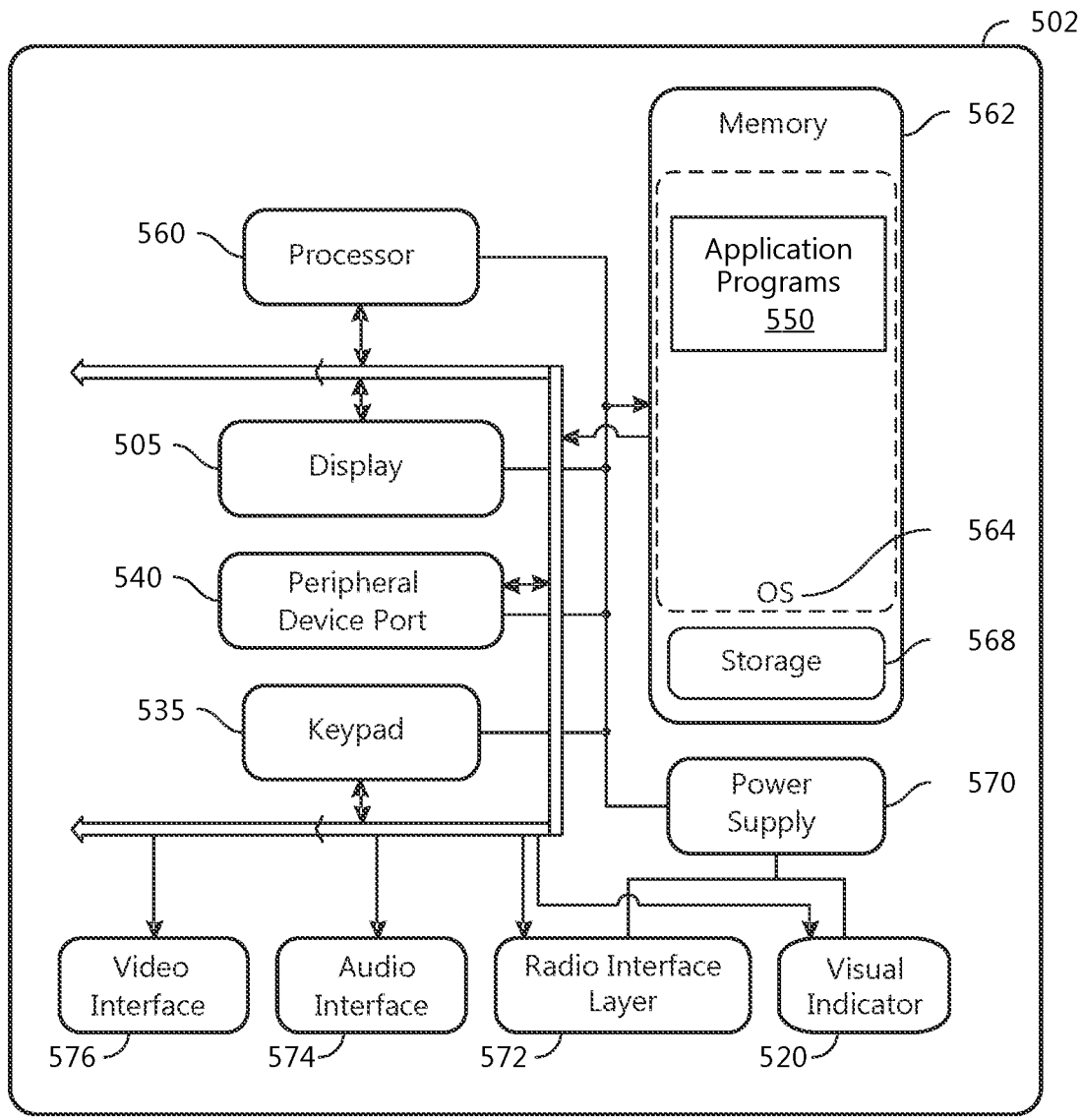
Figure 6:
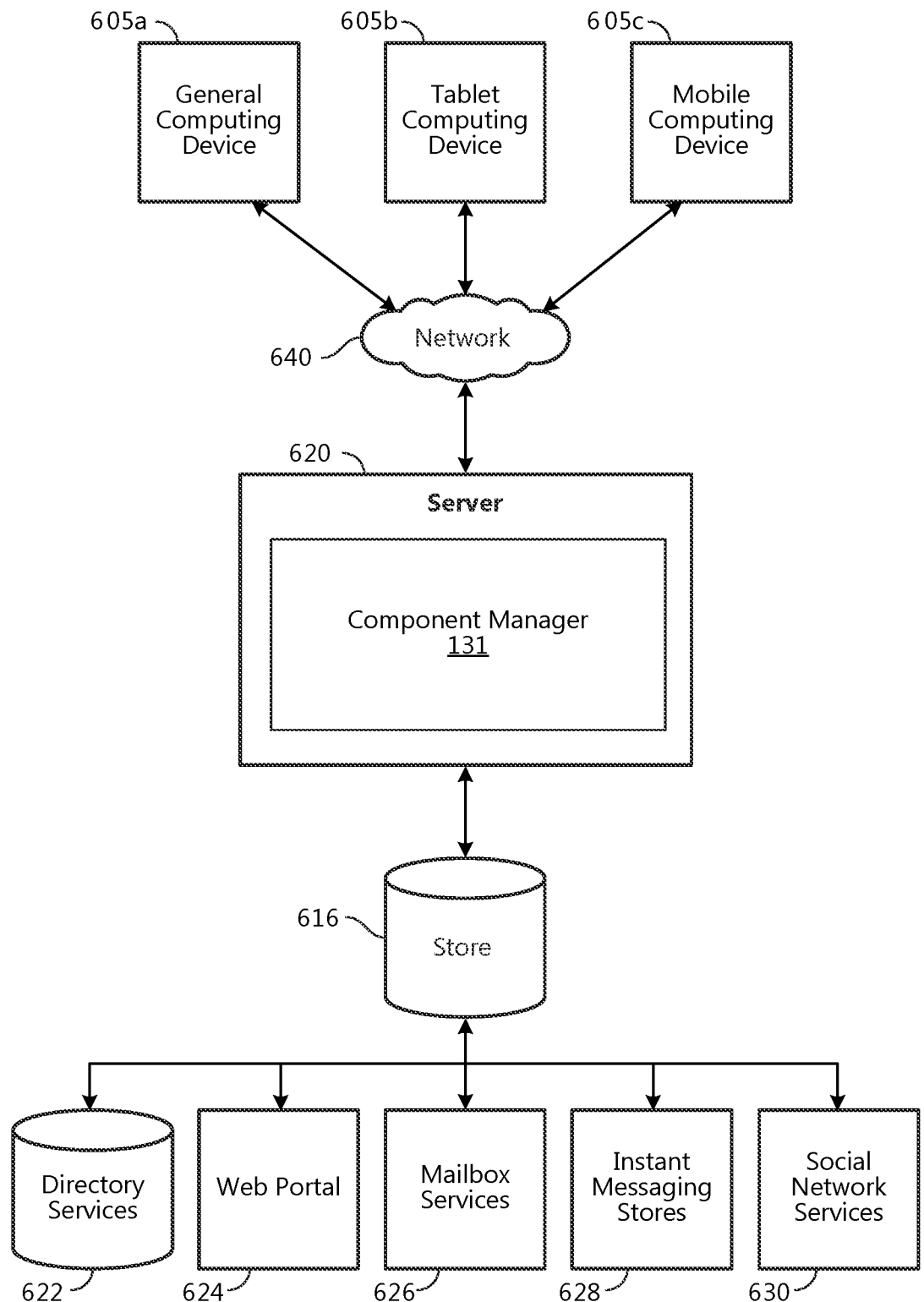
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes applications 450 such as the running process to be experimented upon, the experiment creator 111, the experiment initiator 112, the code vault 120, the component manager 131, or the server agent 132. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., applications 450) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, application programs 550 including the running processes and one or more of the experiment creator 111, experiment initiator 112, code vault 120, component manager 131, or server agent 132 are loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for providing user-targeted modification of a running process on a webserver as described above. Binaries developed, interacted with, or edited in association with the developer device 110 are enabled to be stored in different communication channels or other storage types. For example, various binaries may be stored using a directory service 622, a web portal 624, a mailbox service 626, an instant messaging store 628, or a social networking site 630. The component manager 131 is operative to use any of these types of systems or the like for providing user-targeted modification of a running process on a webserver, as described herein. According to an aspect, a server 620 provides the component manager 131 and the running processes to clients 605a,b,c. As one example, the server 620 is a web server providing the processes modifiable while running by the component manager 131 over the web. The server 620 provides the processes over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for enabling experiments in a running process, the method comprising:
   establishing a parent library;
   establishing, within the parent library, a production file, wherein the production file contains one or more files used to execute the running process,
wherein the one or more files used to execute the running process include one or more version files, and
wherein each of the one or more version files contains a version of the running process, each version of the running process comprising one or more component binaries for the version of the running process;
establishing, within the parent library, an experiment file that is distinct from the production file,
wherein the experiment file contains one or more files used to execute an experimental binary,
wherein the one or more files used to execute the experimental binary includes a plurality of audience files, and
wherein each of the plurality of audience files includes one or more experimental binaries for use with the running process; and
during execution of the version of the running process,
overriding one or more of the component binaries of the version of the running process with corresponding one or more experimental binaries, and
isolating experimental binaries of each of the plurality of audience files such that experimental binaries of each of the plurality of audience files are utilized in isolation from experimental binaries of other of the plurality of audience files.

2. The method of claim 1, wherein the one or more component binaries correspond to the one or more experimental binaries based on the one or more component binaries sharing a same title as the one or more experimental binaries.

3. The method of claim 1, further comprising determining which of the plurality of audience files is the newest and using the one or more experimental binaries from the newest audience file to override the one or more component binaries of the version of the running process.

4. The method of claim 3, the method further comprising backing out one or more older experimental binaries from the running process prior to overriding the one or more component binaries with the newest experimental binaries.

5. The method of claim 3, the method further comprising determining that at least one of the one or more experimental binaries includes a dependency and based on the determination of a dependency, making a first attempt to resolve the dependency from the same audience file containing the at least one experimental binary.

6. The method of claim 5, wherein the first attempt to resolve the dependency is unsuccessful and the method further comprising resolving the dependency only with a corresponding component binary from the version of the running process.

7. A computing device for enabling experiments in a running process, the computing device comprising:
a memory storing executable instructions; and
a processor executing the executable instructions and, based on execution of the instructions, the processor being caused to:
establish a parent library;
establish, within the parent library, a production file, wherein the production file contains one or more files used to execute the running process, wherein the one or more files used to execute the running process include one or more version files, and wherein each of the one or more version files contains a version of the running process, each version of the running process comprising one or more component binaries for the version of the running process;
establish, within the parent library, an experiment file that is distinct from the production file, wherein the experiment file contains one or more files used to execute an experimental binary, wherein the one or more files used to execute the experimental binary includes a plurality of audience files, and wherein each of the plurality of audience files includes one or more experimental binaries for use with the running process; and
during execution of the version of the running process, override one or more of the component binaries of the version of the running process with corresponding one or more experimental binaries, and
isolate experimental binaries of each of the plurality of audience files such that experimental binaries of each of the plurality of audience files are utilized in isolation from experimental binaries of other of the plurality of audience files.

8. The computing device of claim 7, wherein the one or more component binaries correspond to the one or more experimental binaries based on the one or more component binaries sharing a same title as the one or more experimental binaries.

9. The computing device of claim 7, wherein the processor is further caused to determine which of the plurality of audience files is the newest and use the one or more experimental binaries from the newest audience file to override the one or more component binaries of the version of the running process.

10. The computing device of claim 9, wherein the processor is further caused to back out one or more older experimental binaries from the running process prior to overriding the one or more component binaries with the newest experimental binaries.

11. The computing device of claim 9, wherein the processor is further caused to determine that at least one of the one or more experimental binaries includes a dependency and based on the determination of a dependency, make a first attempt to resolve the dependency from the same audience file containing the at least one experimental binary.

12. The computing device of claim 11, wherein the first attempt to resolve the dependency is unsuccessful and the processor is further caused to resolve the dependency only with a corresponding component binary from the version of the running process.

13. Computer storage media storing instructions that when executed by a computing device cause the computing device to enable experiments in a running process, wherein the instructions executed by the computing device comprise instructions to:
establish a parent library;
establish, within the parent library, a production file, wherein the production file contains one or more files used to execute the running process, wherein the one or more files used to execute the running process include one or more version files, and wherein each of the one or more version files contains a version of the running process, each version of the running process comprising one or more component binaries for the version of the running process;
establish, within the parent library, an experiment file that is distinct from the production file, wherein the experiment file contains one or more files used to execute an experimental binary, wherein the one or more files used to execute the experimental binary includes a plurality of audience files, and wherein each of the plurality of audience files includes one or more experimental binaries for use with the running process; and during execution of the version of the running process,
   override one or more of the component binaries of the version of the running process with corresponding one or more experimental binaries, and
   isolate experimental binaries of each of the plurality of audience files such that experimental binaries of each of the plurality of audience files are utilized in isolation from experimental binaries of other of the plurality of audience files.

14. The computer storage media of claim 13, wherein the one or more component binaries correspond to the one or more experimental binaries based on the one or more component binaries sharing a same title as the one or more experimental binaries.

15. The computer storage media of claim 13, wherein the instructions further comprise an instruction to determine which of the plurality of audience files is the newest and use the one or more experimental binaries from the newest audience file to override the one or more component binaries of the version of the running process.

16. The computer storage media of claim 15, wherein the instructions further comprise an instruction to back out one or more older experimental binaries from the running process prior to overriding the one or more component binaries with the newest experimental binaries.

17. The computer storage media of claim 15, wherein the instructions further comprise an instruction to determine that at least one of the one or more experimental binaries includes a dependency and based on the determination of a dependency, make a first attempt to resolve the dependency from the same audience file containing the at least one experimental binary.

18. The computer storage media of claim 17, wherein the first attempt to resolve the dependency is unsuccessful and wherein the instructions further comprise an instruction to resolve the dependency only with a corresponding component binary from the version of the running process.

\* \* \* \* \*